United States Patent Office 3,010,687
Patented Nov. 28, 1961

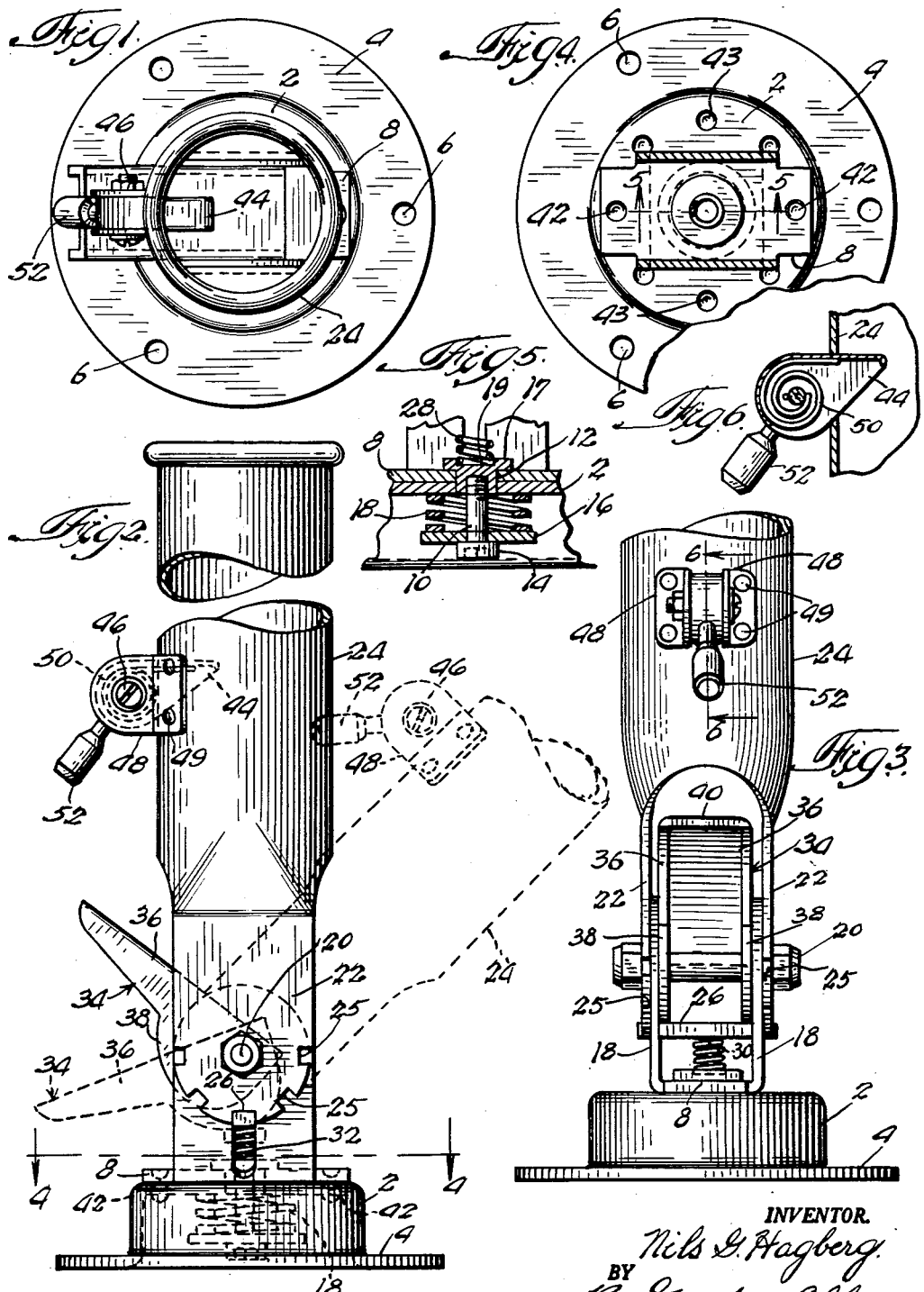

3,010,687
FISHING POLE HOLDER
Nils G. Hagberg, 628 Byron, Deerfield, Ill.
Filed May 19, 1960, Ser. No. 30,379
6 Claims. (Cl. 248—38)

This invention relates to fishing pole holders and more particularly to a holder which will receive and automatically interlock with the butt end of any conventional fishing pole, and which can be adjustably rotated about two angularly related axes for positioning in any desired position.

Prior art fishing pole holders either have no means for positively interlocking with a pole or require that each pole be manually clamped or otherwise attached to the pole holder. Moreover, prior art fishing poles are not easily adjustable to various conditions and require the use of screw type clamps or the like to hold the holder in each adjusted position thereof.

Also, such prior art pole holders are either impractical because they cannot be used with conventional cane poles commonly used for still fishing, as for example, the holders shown in United States Letters Patent, Numbers 2,442,357 and 2,918,237, or such prior art pole devices require that a manually operated clamp be manually tightened on the pole after it has been inserted into the holder, as shown for example in United States Letters Patent, Numbers 1,104,352 and 2,483,012.

Accordingly, it is an object of the invention to devise a fishing pole holder which is sturdy and economical in construction, which is capable of long life in service, and which can be used with all conventional poles.

Another object of the invention is to eliminate any necessity for manually clamping a pole after it has been inserted into the holder.

Still another object of the invention is to provide means for automatically interlocking the holder with a pole as it is inserted into the holder.

A further object of the invention is to accommodate rotation of the holder about two angularly related axes to afford precise positioning of the holder and its pole in a selected position which is one of an infinite number of possible positions.

Yet another object of the invention is to eliminate the necessity for clamping the holder in any selected position thereof.

The foregoing and other objects and advantages of the invention will become apparent from a consideration of the following specification and the accompanying drawings, wherein:

FIGURE 1 is a top plan view of a fishing pole holder embodying a preferred form of the invention;

FIGURE 2 is a side elevational view of the holder shown in FIGURE 1, with certain parts shown by phantom lines in changed positions;

FIGURE 3 is another side elevational view taken from the left as seen in FIGURE 2;

FIGURE 4 is a sectional view on line 4—4 of FIGURE 2;

FIGURE 5 is a sectional view on line 5—5 of FIGURE 4; and

FIGURE 6 is a sectional view on line 6—6 of FIGURE 3.

Describing the invention in detail and referring to the drawings which disclose a preferred embodiment of my novel fish pole holder, it will be seen that the device comprises a hollow base 2 having an annular flange 4 which is perforated as at 6 for the reception of means such as screws or nails to secure the base to a support such as a boat seat or rail (not shown).

A swivel 8 is slideably seated on top of the base 2 for rotational movement relative thereto on a vertical axis X—X (FIGURE 5) of a bolt 10 and a bearing 12 threaded thereon. The bolt head 14 supports a spring plate 16 against which one end of a coiled spring 18 is seated. The spring is under compression with its opposite end seated against the base 2 within which the spring is housed. The bearing 12 has a flange 17 which engages the swivel 8 to transmit reaction of the spring thereto for the purpose of urging the swivel along its downwardly facing surface against an upwardly facing surface of the base to develop frictional resistance to rotation of the swivel on the base.

The bearing 12 is sleeved within complementary openings of the base 2 and swivel 8, and the flange 17 has a central recess 19 for a purpose hereinafter described.

The swivel 8 has spaced upstanding ears or lugs 18 for pivotal attachment by a bolt and nut assembly 20 to spaced ears or lugs 22 on the bottom of a pole holder socket member 24. The lower edges of ears 22 are serrated as at 25 for releasable engagement with a lock bar or latch 26 urged against said edges by a compression spring 28 having its lower end seated within the recess 19 for convenient positioning of said spring. The bottom of the bar 26 has a boss 30 received within the spring to position the lock bar against movement lengthwise thereof through slots 32 (FIGURE 2) of the ears 22 receiving the ends of said lock bar.

The lock bar 26 is illustrated by solid lines in FIGURE 2 at locked position within a pair of serrations 25 of the respective ears 22, at which position rotation of socket member 24 about the longitudinal axis of bolt and nut assembly 20 is positively prevented. A cam 34 is also pivoted on bolt and nut assembly 20 and is shown by solid lines in FIGURE 2 at released position. The cam has spaced legs 36 with cam surfaces 38 engageable with the top of the lock bar 26.

The legs are interconnected by a bridge 40 (FIGURE 3) for convenient actuation by an operator's finger to applied position of the cam 34 illustrated by phantom lines in FIGURE 2 wherein the lock bar is also illustrated by phantom lines in released position, and the socket member 24 is shown by phantom lines at a tilted position which would be proper when fishing with a pole (not shown) in the socket member. If the advantages and convenience of the cam are not desired it may be eliminated and the operator may release the lock bar by direct finger pressure.

It will be understood that by means of the lock bar 26 and cam 34, the socket member may be releasably latched in any one of a plurality of rotationally adjusted positions corresponding to the number of serrations 25 in one ear 22. Six serrations are shown to provide six different positions of the socket member 24, but it will be understood that any desired number of serrations may be provided.

It may also be noted that the swivel is preferably provided with one or more downwardly projecting bosses or protuberances 42 which releasably engage an annular series of indentations 43 in the top surface of the base 2 whereby the socket member 24 is releasably retained at one of a plurality of rotationally adjusted positions about axis X—X.

By reason of the rotational adjustment of member 24, as heretofore described, on two axes perpendicularly related to each other, a pole positioned within socket member 24 can be quickly and conveniently adjusted to any desired position, without operating any thumbscrews or similar locking devices.

My invention also comprehends novel means for releasably locking a pole handle in the socket member 24, said means comprising a finger 44 pivoted by a bolt and nut assembly 46 to spaced brackets 48 mounted as by rivets 49 to the member 24. The axis of assembly 46 which is the pivotal axis of finger 44 is preferably substantially normal to the longitudinal axis of the socket member. A helical torsion spring 50 is mounted on assembly 46, said spring having an end engaging finger 44 to bias it to the position shown in the drawings against the top of an opening in the member 24 through which the finger extends. A handle 52 is connected to the finger 44 for convenient manual actuation thereof.

In operation of the novel device, the butt end of a fishing pole is manually urged to the bottom of a socket 54 in member 24 rotating the finger 44 toward the bottom of the socket. The socket is substantially greater in diameter than the butt end of any conventional fishing pole. Inasmuch as almost all poles taper from their butt end, accidental movement of such a pole outwardly of the socket is positively limited by the finger 44 unless it is manually urged by handle 52 to release position out of engagement with the pole until its butt end has passed outwardly of the finger 44.

When the pole is in the socket, the pole may be held in vertical position or in an adjusted position at either side of the vertical by engagement of lock bar 26 in preselected serrations 25. Additionally, member 24 may be manually rotated about axis X—X to swing the pole to a position whereat bosses 42 are received in a desired pair of indentations 43, whereby accidental swinging is restrained by action of spring 18.

Thus it will be understood that the novel pole holder is not only economical in construction but is well suited for a long life in service without the danger of fouling or rusting of screw threads or similar parts, as in the various clamping means of prior art devices. Moreover, the novel holder automatically interlocks with any conventional pole and can be quickly and conveniently released therefrom by pressure of the operator's finger on handle 52. Another important feature of the invention is the adjustment of the holder to many different positions without the necessity for manually clamping the holder in any selected position and with the assurance that the holder will not become accidentally dislodged from a selected position.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A fishing pole holder comprising a hollow base with a flange having means for removable attachment to a support, a swivel seated on said base, means interconnecting the swivel to the base for rotational movement relative thereto, detent means on the base and swivel for releasable latching the latter in a plurality of selected rotational positions relative to the base, spring means housed in the base and connected to the swivel and base for yieldingly interengaging said detent means, spaced upstanding ears on said swivel, a member with a pole receiving socket, said member having spaced ears pivoted to the first-mentioned ears and having serrations, a lock bar extending through slots of the first-mentioned ears and receivable in selected serrations, and spring means for urging the bar into selected serrations.

2. A fishing pole holder according to claim 1 wherein cam means are pivoted to the member for engagement with the lock bar to urge the lock bar out of associated serrations.

3. A fishing pole holder comprising a base having means for attachment to a support and having an upwardly facing surface with a plurality of indentations, a swivel having a downwardly facing surface engaged with the first-mentioned surface, said downwardly facing surface comprising at least one protuberance selectively engageable with respective indentations, means interconnecting the base and swivel for rotational movement, resilient means connected to the base and swivel for urging said surfaces into engagement, and a socket member carried by the swivel.

4. A fishing pole holder comprising a base having means for attachment to a support, a swivel rotatably mounted on the base, a cam and a socket member pivotably connected to the base for movement relative thereto on a common axis, a lock bar movably carried by the base and selectively receivable within serrations of the socket member to releasably lock the latter in a selected position relative to the base, spring means for urging the lock bar into said serrations, and means on said cam operable manually to engage the cam with the lock bar for urging it out of said serrations against the resistance of said spring means.

5. A fishing pole holder comprising a hollow base having an upwardly facing surface and having means below said surface for attachment to a support, a swivel having a downwardly facing surface slideably seated on the first-mentioned surface, a bearing extending through aligned openings of the swivel and base, said bearing having a flange engaging an upwardly facing surface of the swivel, spring means bound in said base below the first-mentioned surface and compressed against a downwardly facing surface of the base, a spring abutment bearing against said spring at its lower end, means connecting the abutment to the bearing to urge the bearing flange against the second-mentioned upwardly facing surface, a socket member pivotably connected to the swivel for rotation relative thereto, releasable locking means on said member and swivel for locking the member in a selected rotational position relative to the swivel, and resilient means supported by said bearing for actuating said locking means.

6. A fishing pole holder comprising a hollow base with a flange having means for removable attachment to a support, a swivel seated on said base, means interconnecting the swivel to the base for rotational movement relative thereto, a detent means on the base and swivel for releasably latching the latter in a plurality of selected rotational positions relative to the base, spring means housed in the base and connected to the swivel and base for yieldingly inter-engaging said detent means, spaced upstanding ears on said swivel, a member with a pole receiving socket, a finger projecting into said socket and mounted on said member for rotation toward the bottom of the socket on an axis angularly related to the longitudinal axis of the socket, means connected to said finger and extending externally of the socket for manually rotating said finger, spaced serrated ears formed on said member, said ears being pivoted to the first mentioned ears, a lock bar extending through slots of the first mentioned ears and receivable in selected serrations and spring means for urging the bar into selected serrations.

References Cited in the file of this patent
UNITED STATES PATENTS

| | | |
|---|---|---|
| 1,793,910 | Cuthbert et al. | Feb. 24, 1931 |
| 1,985,985 | Gerline | Jan. 1, 1935 |
| 2,414,358 | Calway | Jan. 14, 1947 |
| 2,426,881 | Johnson et al. | Sept. 2, 1947 |
| 2,529,148 | Fratt | Nov. 7, 1950 |